United States Patent [19]

Luise

[11] Patent Number: 4,939,026

[45] Date of Patent: Jul. 3, 1990

[54] ORIENTED SHEETS

[75] Inventor: Robert R. Luise, Boothwyn, Pa.

[73] Assignee: E. I. Du Pont de Nemours and Company, Wilmington, Del.

[21] Appl. No.: 238,506

[22] Filed: Aug. 31, 1988

Related U.S. Application Data

[62] Division of Ser. No. 319, Jan. 5, 1987, Pat. No. 4,786,348.

[51] Int. Cl.$^5$ .............................................. D03D 3/00
[52] U.S. Cl. ................................ 428/224; 428/288; 428/290; 428/296; 428/360; 428/395; 428/910
[58] Field of Search ............... 428/224, 288, 296, 360, 428/395, 910, 290

[56] References Cited

U.S. PATENT DOCUMENTS

| | | | |
|---|---|---|---|
| 4,065,594 | 12/1977 | Shii et al. | 428/113 |
| 4,333,907 | 6/1982 | Urasaki et al. | 264/290.2 |
| 4,362,777 | 12/1982 | Miller | 428/224 |
| 4,384,016 | 5/1983 | Ide et al. | 428/910 |
| 4,600,631 | 7/1986 | Alei et al. | 428/910 |
| 4,664,972 | 5/1987 | Connolly | 428/290 |
| 4,746,566 | 5/1988 | Connolly | 428/290 |
| 4,786,348 | 11/1988 | Luise | 428/296 |
| 4,798,875 | 1/1989 | Itoyama et al. | 428/910 |

Primary Examiner—Thurman K. Page
Assistant Examiner—Archene A. Turner

[57] ABSTRACT

Highly oriented sheets are prepared by hot pressing a warp of filaments of liquid crystal polymers and optionally heat strengthening.

2 Claims, No Drawings

ORIENTED SHEETS

This application is a divisional application of U.S. Ser. No. 07/000,319, filed Jan. 5, 1987 U.S. Pat No. 4786348.

BACKGROUND OF THE INVENTION

Extruded sheets of liquid crystal polymers as well as multiaxially oriented laminates therefrom are described in U.S. Pat. No. 4,384,016. This patent points out that when polymers that exhibit anisotropic properties in the melt phase are extruded through a slit die and drawn in the melt phase, there are obtained sheets which exhibit high machine direction properties but poor transverse directional properties. Biaxially oriented films of liquid crystal polymer are taught in U.S. 4,333,907.

It is also known to the art that heat-treatment of fibers from liquid crystal polymers increases the melting temperature and molecular weight of the polymer while increasing the fiber tensile strength.

Lastly, strong, nonwoven sheets of liquid crystal polymer fiber self-bonded at cross-over points are described in U.S. Pat. No. 4,362,777.

SUMMARY OF THE INVENTION

This invention provides a transparent sheet formed from a hot-pressed warp of filaments of polymer capable of forming an optically anisotropic melt and the transparent heat-strengthened product thereof. Also encompassed are laminates of such sheets made with or without a binder as well as sheets prepared by stretching the heat-strengthened sheets in a direction perpendicular to the warp and processes for making the products.

DETAILED DESCRIPTION OF THE INVENTION

The uniaxial sheets of the present invention have tensile properties that are superior to the extruded sheets of the prior art. It is well known that liquid crystal polymers can be melt-extruded into highly oriented filaments. These filaments are distinct from polyesters, such as polyethylene terephthalate, in that they are oriented as-spun and are strengthened by heating rather than by drawing. See U.S. Pat. No. 4,183,895. This invention takes advantage of the high orientation built into the as-spun liquid crystal polymer fiber.

The novel uniaxial sheets, which, if desired, can be in the form of narrow tapes, are made by forming a warp, i.e., a sheet of essentially parallel filaments, of as-spun liquid crystal polymer. The warp can be made by withdrawing preferably untwisted yarn off multiple bobbins and assembling the yarn side-by-side in the form of a sheet. It can also be made by winding the yarn at a very low wind angle about a plate. Regardless of the manner of its preparation, it is desired that the filaments in the sheet be arranged substantially unidirectionally.

The filaments useful in the invention are melt-spun from liquid crystal polymers. The latter are well known in the art, many being described in U.S. Pat. No. 4,362,777, and patents referred to therein. Fiber from liquid crystal aromatic polyester is preferred.

As mentioned previously, the as-spun filaments from melts of liquid crystal polymers are highly oriented. The process of this invention takes full advantage of the orientation and retains a substantial portion of the orientation in the hot-pressed and heat-strengthened sheets. The filaments are aligned essentially in a single direction, the crystals of the filaments are highly oriented in the filament direction, and the heat pressing fuses adjacent filaments to each without significant deorientation of the crystals. It is for this reason that the hot-pressed sheet is transparent. Heat strengthening which follows hot pressing does not materially deorient the crystals. Thus, the heat-strengthened uniaxially oriented sheets of the present invention are transparent and have substantially better tensile properties than extruded sheets which tend to become disoriented during extrusion.

After the warp of as-spun liquid crystal filaments has been prepared, it is hot-pressed, as, for example, between heated platens, for a time sufficient to form a coherent transparent sheet. The uniaxial orientation of the crystalline polymer is responsible for the transparency. There iS a temperature-pressure relationship involved in hot-pressing any selected filaments to form the coherent transparent sheet. Lower temperatures require higher pressures while higher temperatures permit the use of lower pressures. It is not desirable to maintain the temperature and pressure conditions beyond that necessary to achieve the transparent sheet in order to avoid deorienting the crystals. Thus, the temperature and pressure employed should be that sufficient to form the coherent transparent sheet and preferably no more. Hot-pressing is preferably performed at a temperature below but within 20° C. of the melting endotherm as observed with the differential scanning calorimeter (DSC) and preferably at a pressure of at least 100 pounds per square inch, more preferably from 100 to 350 psi.

The hot-pressed sheet, with pressure removed, is then heat-strengthened by heating it in a purged inert atmosphere such as, for example, nitrogen, argon, or under vacuum, at a temperature below the melting point for a period sufficient to increase tensile strength in the warp direction to a level of at least 180 kpsi. Temperatures of at least 100° C., preferably 200° C. to 400° C., are useful.

The uniaxial sheets may be prepared in any desired thickness. It is preferable, however, in terms of maximum heat treatment response within reasonable time limits, that sheet thickness not exceed about 30 mils (0.076 cm).

If desired, the uniaxial heat-strengthened sheets can be reheated and stretched in the transverse direction to obtain biaxial orientation while reducing tensile strength anisotropy. These stretched sheets are no longer transparent since they have lost uniaxial orientation. On the other hand, they are moderately strong in two directions as compared with the uniaxial sheet which is relatively weak in the transverse direction.

The uniaxial sheets of this invention may also be laminated in uniaxial or quasi-isotropic constructions. Uniaxial laminates may be prepared by hot-pressing layers of the uniaxial sheets at temperatures within about 30° C. of the onset of the DSC melting endotherm and at nominal pressures of 10–50 psi or, alternatively, by the use of a thermoplastic hot-melt adhesive or conventional epoxy resin.

Examples of thermoplastic adhesives include a thin extruded film of the precursor polymer (or any other anisotropic melt-forming polymer with a melting point below that of the uniaxial sheet), and polyoxyethylene terephthalate (PETG) commercial film (Eastman). Examples of epoxies include novolac resins, such as Epon 1139 (CIBA-GEIGY) and ECN 1299 (CIBA-GEIGY), and phenolformaldehyde resins. The additions of such adhesives is desirable in the case of quasi-isotropic laminates.

The materials of this invention are expected to be useful in a number of reinforcement applications, including automobile hoods and leaf springs, belts for radial tires, structural members, pressure vessels, hard armour, optical cables, flex-pipes, and other metal replacement applications envisaged for conventional advanced composite materials. Significant cost savings in fabrication are anticipated versus the latter materials due to the absence of a resin matrix. In addition, the marked transparency of the uniaxial sheets of this invention may permit their use in optical polarizers and information storage devices.

The following examples are illustrative of the invention and are not intended as limiting:

EXAMPLE 1

This example illustrates the preparation of a uniaxially oriented sheet from a yarn of copoly(chlorophenylene/4,4,-biphenylene/terephthalate/isophthalate) (40/10/40/10), mol percent, in which a substantial portion of fiber orientational properties are retained on sheet conversion. The polymer is prepared by methods described in U.S. 4,412,058. The polymer of $\eta_{inh}=2.5$ in pentafluorophenol at 45° C. is melted in a twin-screw melt spinning machine with a melt zone temperature of 330° C. and is spun through a 34-hole spinneret with holes of 0.023 cm diameter and 0.061 cm length at 332° C. into ambient air and is wound up at 1200 mpm, spin stretch factor=83. The 219 denier/34 filament yarn exhibits an orientation angle of 14°, a tensile strength of 143 kpsi (1000 pounds per square inch) and a tensile modulus of 8.7 Mpsi (million pounds per square inch). It possesses a differential scanning colorimeter (DSC) melting endotherm beginning at 300° C.

The yarn is backwound through a 1% wt. solution of aqueous potassium iodide, then continuously wound at 0.1 gpd tension and 11.8 turns/cm (wind angle ~0.3°) on a flat aluminum plate, which is 17.8 cm square ×0.64 cm thick, surfaced with a thermally resistant film ("Kapton" polyimide film, E. I. du Pont de Nemours and Company) and set on a traversing cardwinder. A standard mold release agent is sprayed on the film surface. 27 layers of yarn of 5.08 cm width are wound in a parallel configuration on both sides of the plate. The sample is then placed in a vacuum oven for 60 min. at 130° C. for drying. The dried sample is transferred to a press (Pasadena hydraulic bench press) equipped with 30.5 cm square platens heated at 285° C. An initial pressure of 300 psi (pounds per square inch) is applied which drops to 190 psi over a period of 10 min required for the sample to reach the platens temperature (as measured with a thermocouple in the aluminum plate). The pressure is then released and the sample removed from the press and allowed to cool at ambient conditions. Two transparent, amber-tinted plastic sheets of 8.2 cm width, 15.7 cm length and 0.038 cm thickness are recovered.

A sheet sample is placed on a woven fiberglass mat in a nitrogen-purged oven and heated stagewise at 240° C. for 2 hr, 270° C. for 2 hr, and 305° C. for 16 hr, whereupon the oven is cooled to room temperature (RT) and the heat-treated sample recovered. The heat-treated sample has retained its transparency and has noticeably increased in toughness.

The tensile properties in the fiber axis direction of as-molded and heat-treated samples are measured in an Instron tensile testing machine. Test specimens are cut in a dogbone shape of 12.7 cm length and 1.3 cm outer and 0.64 cm inner widths, respectively. The inner length is 5.08 cm and corresponds to the gage length of the testing. The sample is tabbed on each end with rectangular aluminum tabs of 1.3 cm width and 3.9 cm length, using a standard heat-curable epoxy resin tape as adhesive. After curing the adhesive, the sample is ready for testing. The asmolded (not heat-treated) sample is found to possess a tensile strength of 82.0 kpsi, a tensile modulus of 6.5 Mpsi, and orientation angle of 14° (18.8°), while the heat-treated sample exhibits a tensile strength of 217.5 kpsi, a tensile modulus of 6.8 Mpsi and an orientation angle of 13° (17.7°). The precursor yarn, coated with potassium iodide and heat treated at the same conditions, exhibits a tensile strength of 354.5 kpsi, a tensile modulus of 8.9 Mpsi, and orientation angle of 16° (19.1°).

EXAMPLE 2

The example illustrates the preparation of a uniaxially oriented sheet and evaluation of tensile properties in the oriented (0°) and transverse (90°) directions. A polymer of the composition of Example 1 is prepared by the same procedures and spun in the same spinning machine with a melt zone temperature of 335° C. through a 100-hole spinneret with holes of 0.013 cm diameter and 0.061 cm length at 331° C. into ambient air and is wound up at 500 mpm (meters per minute), spin stretch factor=33. The 500 denier/100 filament yarn exhibits essentially the same tensile properties as that of Example 1, and a DSC melting endotherm beginning at 301° C.

The yarn is backwound through a 1% wt. solution of aqueous potassium iodide containing a dispersant, then continuously wound at 0.1 gpd tension and 1.18 turns/cm on a flat aluminum plate which is 25.4 cm wide ×27.3 cm long ×0.64 cm thick, surfaced with a film of "Kapton" polyimide and set on a traversing cardwinder. Four layers of yarn of 15.2 cm width are wound on both sides of the plate. The sample is then dried in a vacuum oven for 60 min at 130° C., and transferred to a press as in Example 1 with platens heated to 290° C. The sample is heated at contact pressure until the platens temperature is attained (about 10 min), whereupon a pressure of 111 psi is applied and maintained for 10 min at 290° C. The pressure is then released and the sample removed from the press and allowed to cool at ambient conditions. Two transparent plastic sheets of 15.2 cm width, 22.9 cm length and 0.023 cm thickness are recovered. The sheets are placed on a woven fiberglass mat in a nitrogen-purged oven and heated stagewise to 200° C. in 2 hr, from 200° C. to 306° C. in 7.3 hr, and at 306° C. for 7.5 hr, whereupon the oven is cooled to RT and the heat-treated sample removed.

The tensile properties in the fiber axis direction (0°) are measured on test specimens as prepared in Example 1. The sample exhibits a tensile strength (0°)=259.4 kpsi, ultimate elongation (0°)=6.0%, and tensile modulus (0°)=6.9 Mpsi. The tensile properties in the transverse (90°) direction are obtained by cutting transverse strips of 1.27 cm width. The strips are tabbed as in Example 1 and tested in an Instron tensile testing machine at 2.5 cm gage length. The sample exhibits a tensile strength (90°)=5.2 kpsi, ultimate elongation (90°)=3.5% and tensile modulus=0.5 Mpsi.

EXAMPLE 3

This example illustrates the preparation of a uniaxially oriented sheet from fibers of the thermotropic copolyester copoly(chloro-p-phenylene/4,4,-biphenylene/terephthalate/isophthalate) (40/10/47/3) mole percent basis. The polymer is prepared by methods described in U.S. 4,412,058 with $\eta_{inh}$=in pentafluorophenol at 45° C. The polymer is melted in a twin-screw melt sinning machine with a melt zone temperature of 349° C. and is spun through a 34-hole spinneret with holes of 0.018 cm diameter and 0.23 cm length at 341° C. into ambient air and is wound up at 1018 mpm, spin stretch factor=58. The 190 denier/34-filament yarn exhibits a tensile strength of 77.9 kpsi (4.2 gpd), a tensile modulus of 11.2 Mpsi (605 gpd), and a DSC melting endotherm beginning at 317° C.

A lay-up containing 32 layers of yarn is prepared as in Example 1, and pressed at similar conditions as in Example 1, except the platens temperature is maintained at 300° C. Two transparent amber-tinted plastic sheets of 0.047 cm thickness are recovered.

A sheet sample is heat treated as in Example 1. The heat-treated sample has retained much of its transparency and has noticeably increased in toughness. The tensile strength (TS) and tensile modulus (TM) of the as-molded and heat-treated sheets in the oriented (0°) direction, as tested by Example 1 procedures, are as follows:

|  | TS (kpsi) | TM (Mpsi) |
|---|---|---|
| As-molded | 70.3 | 7.6 |
| Heat-treated | 212.8 | 8.8 |

EXAMPLE 4

This example illustrates the preparation of a uniaxially oriented sheet from fibers of the thermotropic copolyester copoly(chloro-p-phenylene/ terephthalate/naphthalate) (50/35/15) mole percent basis. The polymer is prepared by methods described in U.S. 4,118,372 and is insoluble in pentafluorophenol at 45° C. The polymer is melted in a twin-screw melt-spinning machine with a melt zone temperature of 325° C. and is spun through a 100-hole spinneret with holes of 0.013 cm diameter and 0.030 cm length at 330° C. into ambient air and is wound up at 878 mpm (spin stretch factor=49).

The 384 denier/100 filament yarn has a tensile strength of 102 kpsi (5.5 gpd) and a tensile modulus of 9.5 Mpsi (513 gpd), and a DSC melting exotherm beginning at 297° C.

The yarn is plied twice, and a lay-up containing 4 layers of the two-plied yarn of 40.6 cm width is prepared as in Example 1, and pressed at a platens temperature of 290° C. A pressure of 250 psi is maintained on the sample for 10 min at 290° C., whereupon the pressure is released and the sample removed from the press and allowed to cool at ambient conditions. Two transparent, amber-tinted plastic sheets of 40.6 cm width, 15.2 cm length, and 0.028 cm thickness are recovered.

A sheet sample is heat treated as in Example 2. The heat-treated sample has retained much of its transparency and has noticeably increased in toughness. The TS and TM of the heat-treated sheet in the oriented (0°) and transverse (90°) directions, as tested by procedures of Examples 1 and 2, are as follows:

|  | TS (kpsi) | TM (Mpsi) |
|---|---|---|
| 0° direction | 254.3 | 7.3 |
| 90° direction | 3.0 | 0.25 |

The corresponding heat-treated yarn has a tensile strength of 451 kpsi and tensile modulus of 9.1 Mpsi.

EXAMPLE 5

This example illustrates the preparation of a biaxial oriented film with improved tensile strength balance, obtained by lateral stretching of a uniaxially oriented sheet prepared from a yarn of the thermotropic copolyester composition of Example 1. The polymer is prepared by methods of Example 1 and spun as in Example 2. The 560 denier/100 filament yarn exhibits essentially the same tensile properties as that of Example 1. A pair of uniaxially oriented sheets of 0.033 cm thickness are prepared at essentially the same conditions as Example 1 except that the winding consists of 10 layers of yarn of 6.35 cm width. The sheets are heat strengthened as in Example 2. A 6.0 cm square specimen is then cut from one of the sheets and clamped in a conventional film stretching machine preheated at 200° C. The sample is clamped (fixed) in the oriented or longitudinal (0°) direction, heated at 200° C. for 10 min, and then stretched 400% in the transverse (90°) direction. Rectangular strips of 1.27 cm width and 0.009 cm thickness are then cut from the opaque stretched sheet in the longitudinal (0°) and transverse (90°) directions. The strips are tabbed as in Example 1, and tensile strengths determined in an Instron tensile testing machine at 1.27 cm gage length (0° strip) and 2.54 cm gage length (90° strip).

The 0° and 90° tensile strengths of the unstretched heat-strengthened sheet are also determined by methods described in Example 2. The tensile strength (TS) of the unstretched and stretched heat-treated sheets in the longitudinal (0°) and transverse (90°) directions, as summarized below, reflect an improved tensile strength balance due to stretching.

|  | TS (0°), kpsi | TS (90°), kpsi |
|---|---|---|
| Unstretched | 275 | 4.5 |
| Stretched | 36.4 | 20.6 |

EXAMPLE 6

This example illustrates the preparation of a uniaxially oriented laminate without an added adhesive. A polymer of the composition of Example 1 is prepared by similar procedures, and is spun in a manner similar to that described in Example 2. A uniaxial sheet is prepared from the 490 denier yarn as described in Example 1: 12 layers of yarn of 15.2 cm width are wound on a flat aluminum plate of 22.9 cm square and 0.64 cm thickness; the sample is pressed at 285° C. and 352 psi for 5 min. The resulting pair of plastic sheets measure 16.5 cm ×22.9 cm ×0.053 cm thickness. One of the sheets is heat-strengthened by the procedures of Example 2. The heat-treated sheet has a DSC melting endotherm beginning at 329° C. Six strips of 1.27 cm width ×15.24 cm length (the length corresponding to the oriented (0°) direction of the sheet) are cut and placed in a metal unibar mold. The mold is transferred to a press heated at 325° C., and the sample is held at 325° C. for 7 min at about 20 psi (minimum contact pressure). The sample thickness before and after pressing are 0.32 cm and 0.30 cm, respectively. The flexural strength and modulus, as measured with a standard Instron flexural testing machine, are 42.9 kpsi and 5.1 Mpsi, respectively, at a span/thickness ratio of 32/1. A short beam strength of 5.4 kpsi is obtained at a span/thickness ratio of 4.2/1.

EXAMPLE 7

This example illustrates the preparation of uniaxial and cross-ply laminates from high strength uniaxial sheets using a thin extruded film of the precursor polymer as a thermoplastic adhesive. A polymer of the composition of Example 1 is prepared by similar procedures, and is spun into fibers in a manner similar to that described in Example 2. The yarn is the same as that used in Example 6. Two sets of uniaxial sheets measuring 10.2 cm width ×15.2 cm length ×0.036 cm thickness are prepared by winding 10 layers of the 560 denier yarn of 6.35 cm width at 11.8 turns/cm on a flat aluminum plate which is 17.8 cm square ×0.64 cm thick. The samples are molded at a press temperature of 285° C. and pressure of 300 psi in a manner similar to Example 1. The resulting sheets are heat treated as described in Example 2. The heat-treated sheet has a DSC melting endotherm at 330° C. The sheets are cut into 6.35 cm square elements which are used to prepare 4-ply uniaxial (0° /0° /0° /0°) and cross-ply (0° /90° /90° /0°) laminates. A film of 0.002 cm thickness of the same polymer composition prepared by standard film extrusion procedures is also cut into 6.35 cm square elements and placed between the three successive sheet layers comprising each laminate. The extruded film has a DSC melting endotherm at 304° C. The laminates are transferred to a press heated at 315° C. and pressed between aluminum plates lined with "Kapton" film for 10 min at about 50 psi (close to minimum contact pressure). They are then removed from the press and allowed to cool at ambient conditions. The laminates are observed to have a smooth, glossy surface. Their thicknesses are 0.14 cm (0° /0° /0° /0°) and 0.15 cm (0° /90° /90° /0°). Strips of 1.27 cm width are then cut (in the 0° direction for the 0° /0° /0° /0° laminate), and the flexural strength (FS), flexural modulus (FM) and short beam shear (SBS) strength tested on standard Instron flexural testing machine. The resulting properties for each laminate are summarized below:

| 0°/0°/0°/0° |
|---|
| FS (span/thickness = 16/1) = 66.6 kpsi |
| FM (span/thickness = 32/1) = 7.6 Mpsi |
| SBS (span/thickness = 7/1) = 4.9 kpsi |

| 0°/90°/90°/0° |
|---|
| FS (span/thickness) = 16/1) = 44.0 kpsi |
| FM (span/thickness) = 32/1) = 4.6 Mpsi |
| SBS (span/thickness) = 7/1) = 4.2 kpsi |

EXAMPLE 8

This example illustrates the preparation of uniaxial and cross-ply laminates from uniaxial sheets using an epoxy thermoset adhesive. A set of heat-treated uniaxial sheets of 0.064 cm thickness are prepared at conditions similar to that described in Example 7. Eight (8) layers of 860 denier/200 filament yarn are utilized and the press conditions are 293° C. and 111 psi for 5 min. After heat treatment, the sheets are cut into rectangular strips of 1.27 cm width and 12.7 cm length in both 0° and 90° orientation directions, which are used to prepare 4-ply uniaxial (0° /0° /0° /0°) and cross-ply (0° /90° /90° /0°) laminates. A 10% wt solution of a standard phenol novolac epoxy resin (EPN 1139, CIBA-GEIGY) in methylene chloride is prepared The strips are coated with the epoxy solution, air dried for 5 min, then coated and dried again. 4-Ply uniaxial and cross-ply laminate bars are then assembled and transferred to a press heated at 300° C. and pressed between aluminum plates lined with "Kapton" film for 5 min at about 50 psi (close to minimum contact pressure). They are then removed from the press and allowed to cool at ambient conditions. The flexural strength (FS) and modulus (FM) of the uniaxial and cross-ply strips are then obtained as in Example 7:

| 0°/0°/0°/0° |
|---|
| Thickness = 0.28 cm |
| FS (span/thickness = 16/1) = 67.4 kpsi |
| FM (span/thickness = 44/1) = 6.6 Mpsi |

| 0°/90°/90°/0° |
|---|
| Thickness = 0.24 cm |
| FS (span/thickness = 16/1) = 21.0 kpsi |
| FM (span/thickness = 50/1) = 5.4 Mpsi |

I claim:

1. A transparent sheet formed from a warp of optically anisotropic melt-forming polymer filaments aligned essentially in a single direction and having crystals that are highly oriented in the filament direction, said sheet having a tensile strength of at least 180 Kpsi in the filament direction.

2. A laminate formed from several layers of the sheet of claim 1.

* * * * *